(12) United States Patent
Crocker

(10) Patent No.: US 11,619,449 B2
(45) Date of Patent: Apr. 4, 2023

(54) MELTING KETTLE

(71) Applicant: Waterblasting, LLC, Stuart, FL (US)

(72) Inventor: James P. Crocker, Stuart, FL (US)

(73) Assignee: WATERBLASTING, LLC, Stuart, FL (US)

(*) Notice: Subject to any disclaimer, the term of this patent is extended or adjusted under 35 U.S.C. 154(b) by 253 days.

(21) Appl. No.: 17/078,769

(22) Filed: Oct. 23, 2020

(65) Prior Publication Data

US 2021/0123678 A1 Apr. 29, 2021

Related U.S. Application Data

(60) Provisional application No. 62/944,788, filed on Dec. 6, 2019, provisional application No. 62/925,628, filed on Oct. 24, 2019.

(51) Int. Cl.
*F27B 14/14* (2006.01)
*B29B 7/12* (2006.01)
(Continued)

(52) U.S. Cl.
CPC .......... *F27B 14/14* (2013.01); *B01F 27/112* (2022.01); *B01F 27/191* (2022.01);
(Continued)

(58) Field of Classification Search
CPC .. B01F 15/065; B01F 7/18; B01F 7/20; B01F 7/0025; B01F 7/00258; B01F 7/00075; B01F 7/00041; B01F 7/165; B01F 7/00275; B01F 2215/0422; B01F 27/112; B01F 27/191; B01F 27/192; B01F 27/96; E01C 19/08; E01C 23/20; E01C 23/206; C10C 3/12; B28C 5/12; B28C 5/16; F27B 14/14;
(Continued)

(56) References Cited

U.S. PATENT DOCUMENTS 2,706,111 A * 4/1955 Kniveton ................ F27B 14/00
266/166
4,082,587 A 4/1978 Eigenmann
(Continued)

FOREIGN PATENT DOCUMENTS

CH 509470 6/1971
GB 2059430 4/1981
(Continued)

*Primary Examiner* — Charles Cooley
(74) *Attorney, Agent, or Firm* — McHale & Slavin, P.A.

(57) ABSTRACT

Melting kettles for use on vehicles for continuous processing of material for applying lines, stripes, bitumen, crack sealant or the like. The kettles disclosed herein provide heat transfer by use of oil jacketed tanks. A coil may be placed along a lower section for heat transfer through a burner for heating recirculated oil. A coil may be placed in a lower section and an upper section for heating an oil jacket, as well as heat transfer from the entire circumference of a coil placed in the upper section. An upper coil can be fluidly coupled to a lower coil and positioned within the chamber a spaced apart distance from the interior wall of the melter kettle. A mixer system rotates paddles to cause continuous transfer of material around the upper coil. The melter kettle is cylindrical, but can be corrugated to increase heatable surface area.

6 Claims, 9 Drawing Sheets

(51) Int. Cl.
| | |
|---|---|
| *B29B 7/82* | (2006.01) |
| *B29B 13/02* | (2006.01) |
| *F27B 14/20* | (2006.01) |
| *B01F 27/96* | (2022.01) |
| *B01F 27/112* | (2022.01) |
| *B01F 27/191* | (2022.01) |
| *B01F 27/192* | (2022.01) |
| *F27B 14/08* | (2006.01) |
| *E01F 9/518* | (2016.01) |
| *E01C 23/20* | (2006.01) |

(52) U.S. Cl.
CPC ............ *B01F 27/192* (2022.01); *B01F 27/96* (2022.01); *B29B 7/12* (2013.01); *B29B 7/82* (2013.01); *B29B 13/022* (2013.01); *F27B 14/20* (2013.01); *E01C 23/20* (2013.01); *E01F 9/518* (2016.02); *F27B 2014/0843* (2013.01); *F27B 2014/0881* (2013.01); *F27B 2014/0887* (2013.01)

(58) Field of Classification Search
CPC .............. F27B 14/20; F27B 2014/0843; F27B 2014/0881; F27B 2014/0887; B29B 7/12; B29B 7/82; B29B 13/022; E01F 9/518
USPC ...... 366/144–149; 404/92, 95, 113, 115, 116
See application file for complete search history.

(56) References Cited

U.S. PATENT DOCUMENTS

| | | | | |
|---|---|---|---|---|
| 4,506,982 A * | 3/1985 | Smithers | ............... | B01F 33/502 366/65 |
| 4,692,028 A * | 9/1987 | Schave | ............... | E01C 23/0973 366/601 |
| 4,887,908 A * | 12/1989 | Montgomery | .......... | E01C 19/45 366/4 |
| 5,785,760 A | 7/1998 | Sconyers | | |
| 6,012,447 A * | 1/2000 | Waxler | ................. | B29B 13/022 68/132 |
| 6,012,870 A * | 1/2000 | Dillingham | ............. | E01C 19/08 404/101 |
| 6,109,826 A * | 8/2000 | Mertes | .................... | E01C 19/45 404/95 |
| 8,992,120 B2 * | 3/2015 | Fredrickson | ............ | E01C 23/16 404/95 |
| 9,132,570 B2 * | 9/2015 | Trimborn | ................. | E01C 19/08 |
| 9,732,280 B1 * | 8/2017 | Hollar | ..................... | B01F 23/47 |
| 10,126,054 B1 * | 11/2018 | Shea | ........................ | F27B 14/14 |
| 10,126,057 B2 * | 11/2018 | Shea | ........................ | F27D 3/06 |
| 11,192,130 B2 * | 12/2021 | Crocker | ................... | E01C 23/22 |
| 2003/0062427 A1 | 4/2003 | Bien | ........................ | E04D 15/07 239/128 |
| 2018/0031320 A1 * | 2/2018 | Shea | ........................ | F27B 9/145 |
| 2018/0230658 A1 * | 8/2018 | Wilkens | .................. | B05B 9/002 |
| 2019/0063013 A1 * | 2/2019 | Shea | ........................ | F27B 14/14 |
| 2021/0123677 A1 * | 4/2021 | Crocker | ................. | B29B 13/022 |
| 2021/0123678 A1 * | 4/2021 | Crocker | ................. | B01F 27/96 |
| 2021/0170434 A1 * | 6/2021 | Crocker | ................. | G01F 23/292 |

FOREIGN PATENT DOCUMENTS

| | | | | |
|---|---|---|---|---|
| GB | 2305996 A * | 4/1997 | .......... | B29B 13/022 |
| KR | 20100037423 | 4/2010 | | |
| KR | 20180049779 | 5/2018 | | |
| WO | WO-8200193 A1 * | 1/1982 | | |
| WO | WO-2007035982 A1 * | 4/2007 | .......... | B01F 15/065 |
| WO | WO-2021081343 A1 * | 4/2021 | .......... | B01F 7/0025 |
| WO | WO-2021081344 A1 * | 4/2021 | .......... | B01F 7/0025 |

* cited by examiner

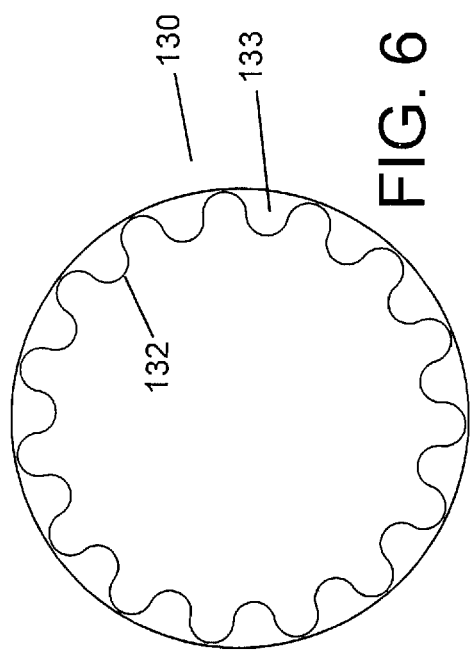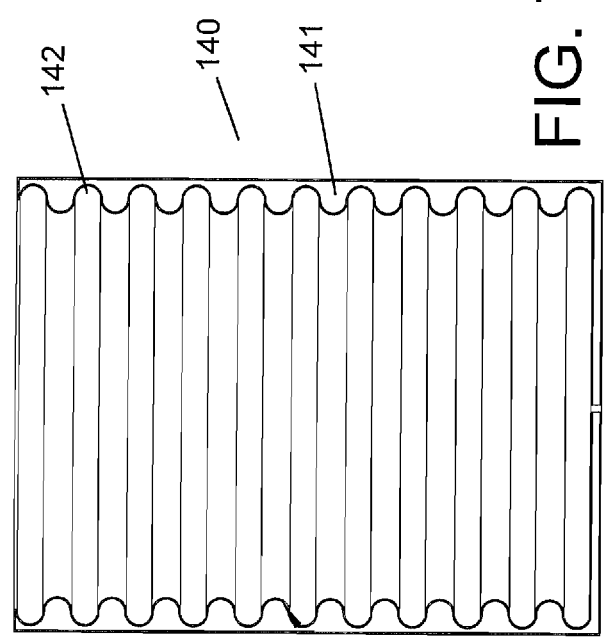

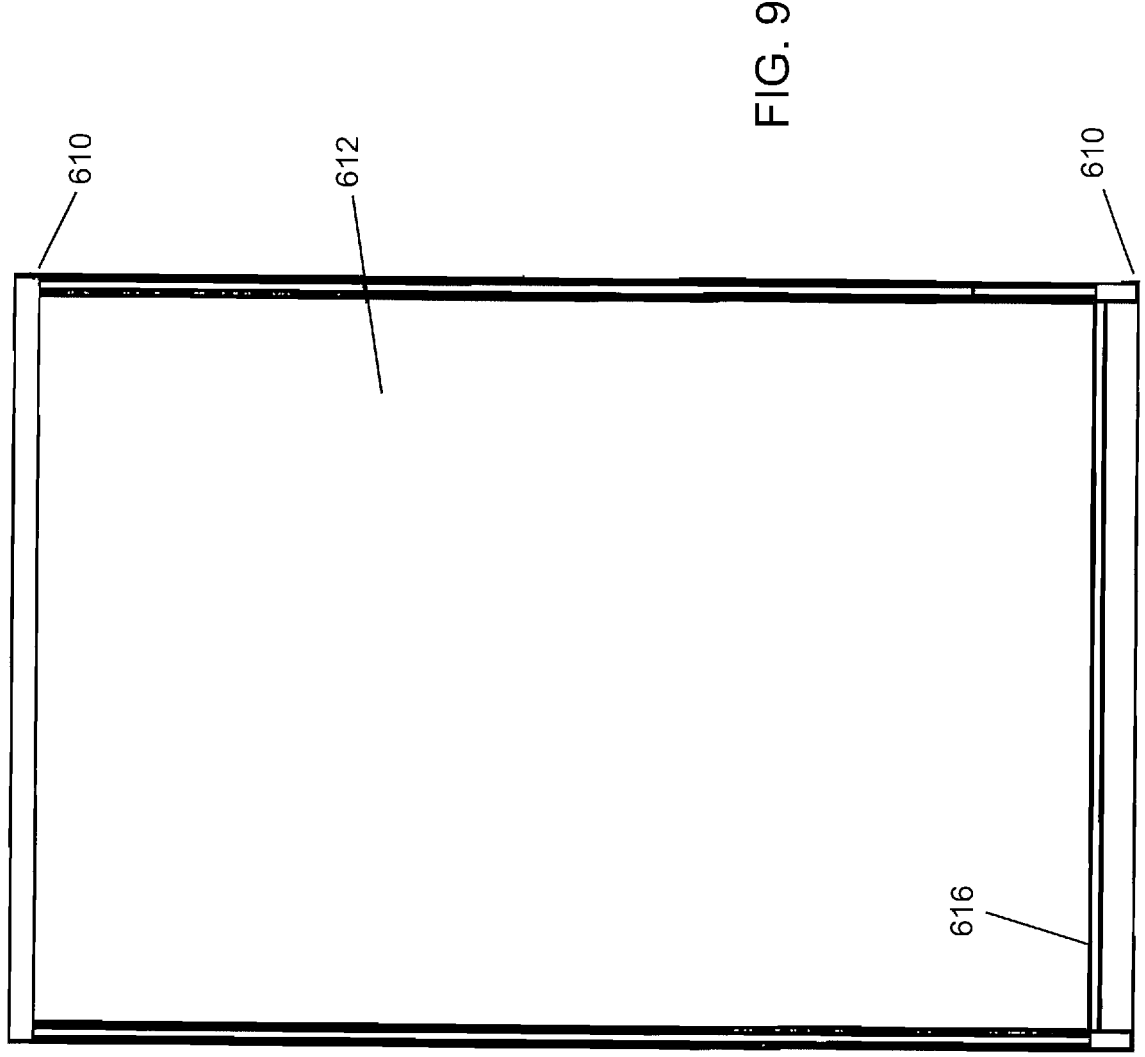

MELTING KETTLE

CROSS REFERENCE TO RELATED APPLICATION

In accordance with 37 C.F.R. 1.76, a claim of priority is included in an Application Data Sheet filed concurrently herewith. Accordingly, the present invention claims priority to U.S. Provisional Patent Application No. 62/925,628 filed Oct. 24, 2019, entitled "Thermoplastic Extrusion Truck" and U.S. Provisional Patent Application No. 62/944,788 filed Dec. 6, 2019, entitled "Improved thermoplastic extrusion markings"; the contents of which are incorporated herein by reference.

FEDERALLY SPONSORED RESEARCH OR DEVELOPMENT

Not Applicable

FIELD OF THE INVENTION

This invention is directed to the field of roadway marking equipment and, in particular, to melters for use on vehicles applying thermoplastic extrusions, bitumen, crack sealant and the like.

BACKGROUND OF THE INVENTION

Extrusion vehicles are used to melt and deliver molten material to a roadway. For purposes of discussion, the molten material referred to herein will be primarily thermoplastics, but it will be obvious to one skilled the art that the extrusion vehicles can be also used for applying bitumen, crack sealant and the like. The traditional method involves direct fire applied to kettles holding thermoplastic materials which are transposed into a molten state and delivered to the roadway to produce a variety of roadway line sizes and profiles. The thermoplastic material is melted over the course of hours and, once the kettles are fully heated, operators apply the material to the roadway as long as material remains in the pots. This applies to bitumen and crack sealant, as well as thermoplastic material. Conventional pots typically hold enough material for only an hour or two of application time. If additional material is added, the new material takes time to liquefy and come up to temperature. During this time, the material in the kettle must endure a recovery time from the injection of unheated material. Under the conventional method, when the melted material in the kettle has been used, the crew must wait hours before another kettle is ready for application. Recovery time is an industry term pertaining to the amount of time it takes to melt another batch of thermoplastic material and reach a target temperature of about 400° F.

The thermoplastic material that is liquefied in a melting kettle is originally in powder form. The mix contains about 40% glass beads for reflectivity and a blend of about 60% plastic elements. There is an operable temperature, and a temperature at which the application of a thermoplastic strip is not at all workable. Many states require the temperature to be between 400° F. and 425° F. in order for the work to be acceptable. If the material is too hot, the thermoplastic will adhere to the road, but the glass beads within the applied material will sink into the applied material, rendering the material inadequate for nighttime reflectivity motoring conditions. If the applied material is too cold, the glass beads will not penetrate the applied material and the material itself is less likely to adhere to the roadway. For these reasons alone, temperature control and recovery time are critical to thermoplastic material implementation and glass bead retention.

In yet another embodiment, a melting kettle can be designed to receive bags of powered material on a continuous basis. When each bag of powdered material enters the melting kettle, it is met with molten material that is already at temperature and being delivered by a pump designed for liquefied thermoplastic material. The pump allows molten material to flow over the top of the incoming powder to reduce recovery time, as the powder will not flow through heat exchanger tubes unless the material has been converted from powder form into a liquefied state. However, in such an embodiment it is possible to outpace the top section of the melting kettle. For instance, a melt rate of 8,000 pounds per hour, per color, may consist of a truck having a white melting kettle and a yellow melting kettle. If a crew tries to melt 16,000 total pounds per hour, it likely that the burner used for heating oil employing a conventional heat exchanger process will have a long recovery time.

What is needed in the industry are improvements in the heating process recovery time, allowing continuous processing of thermoplastic material and reducing or eliminating recovery time.

SUMMARY OF THE INVENTION

Disclosed are improvements in melting kettles for use on extrusion vehicles to allow continuous processing of material used for applying lines and stripes to a roadway. Embodiments include hot oil jacketed kettles, burners incorporated into the base of the kettle, and placement of a coil within the chamber of the kettle.

An objective of the invention is to reduce or eliminate recovery time wherein one embodiment is to employ a melting kettle wherein a coil is installed within the melting kettle chamber and hot oil is passed through the coil, with material inside the chamber surrounding the coil for improved heat transfer.

Another objective of the invention is to teach the use of coils having a manifold wherein a plurality of tubes are coupled together with a common inlet and a common outlet, the plurality of tubes optimizing heat transfer as compared to a single tube coil.

Still another objective of the invention is to teach the use of oil jacketed kettles in conjunction with heat exchangers either integral or external to the melter kettle.

Another objective of the invention is to teach the use of a corrugated interior wall to increase heatable surface area of a tank.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 6 depicts the interior area of a vertically corrugated kettle;

FIG. 7 is a partial pictorial view of a horizontally corrugated kettle;

FIG. 9 is a cross sectional view of FIG. 8 taken along lines AA;

DETAILED DESCRIPTION OF THE INVENTION

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
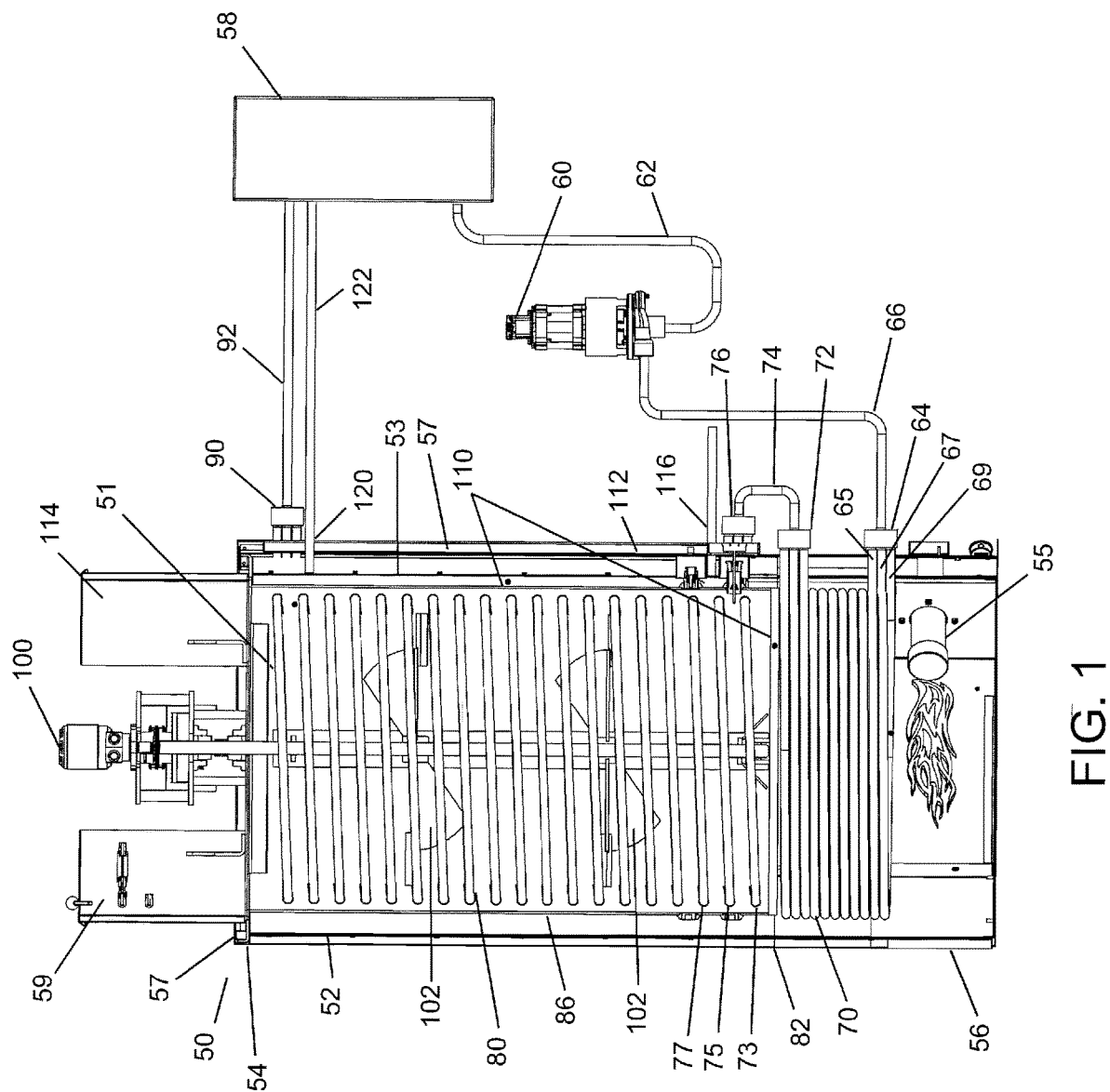
FIG. 1 is a cross sectional view of an embodiment illustrating an oil jacketed kettle employing an internal burner with upper manifold coils.

Referring to FIG. 1, the instant invention is directed to an improved melter kettle 50 having a cylindrical side wall 52 defining a top section 54 and a bottom section 56. In the bottom section 56 is a burner 55 used to heat oil. The oil is recirculated from an oil tank 58 coupled to an oil pump 60. The oil pump 60 draws the oil from the oil tank 58 through transfer line 62 into feed line 66 which is coupled to a lower manifold inlet 64. In this embodiment, the lower manifold inlet 64 splits the feed line 66 into three tubes 65, 67 and 69, which form a lower coil 70 to increase heat transfer efficiency. The tubes of the lower coil 70 allow a predetermined amount of oil to be exposed to the sidewalls of the tubes for greater heat transfer through convection. The use of two tubes, or four or more tubes, is considered within the scope of this invention, with the preferred embodiment being three tubes.

Oil is passed through the lower coil 70, wherein the flame from the burner 55 heats the oil which is collected by a lower manifold outlet 72 and delivered through a transfer line 74 to an upper manifold inlet 76. The upper manifold inlet 76 is again divided into three tubes 73, 75 and 77, which form an upper coil 80 that is placed within the kettle chamber 51 and positioned above a burner wall 82 that forms the bottom of the chamber 51 between the top section 54 and the bottom section 56 of the melter kettle 50. The upper coil 80 is spaced apart from the cylindrical wall 52 and extends along the interior surface 86, the upper coil 80 being spaced sufficiently from the interior surface 86 so as to allow the flow of liquid material to immerse the entire circumference of the upper coil 80. This embodiment supplements or eliminates the need for pumping liquid thermoplastic through a separate heat exchanger for processing, and provides an efficient transfer of heat without the use of extended transfer lines for greater efficiency. Collection header 90 is used to collect the oil from the upper coil 80 for return to the oil tank 58 by coupling pipe 92.

A mixer motor 100 is used for driving paddles 102 to mix the liquefied material throughout the chamber 51. The paddles 102 move the material around the upper coil 80, again noting that the upper coil 80 is spaced a predetermined distance from the inner surface 86 to allow heat transfer along the entire circumference of the coil 80. A cover 57 is placed over the chamber 51.

The melting kettle 50 includes an oil jacket 110 around the cylindrical sidewall 82 wherein hot oil transfers heat to the material within the kettle chamber 51. Oil is delivered to the oil jacket 110 from the oil pump 60 through an oil jacket inlet 116, and oil is collected from the oil jacket 110 at an outlet 120 for return to the oil tank 58 through return line 122. The oil jacket 110 includes a series of baffles within a space between the kettle's cylindrical sidewall 52 and an oil jacket sidewall 53. Surrounding a majority of the oil jacket sidewall 53 is an insulated wall 57 providing a chimney space 112 for passing of waste heat and unburnt fuel for exhausting through a chimney stack 114. The cover 57 may be opened for inspection of the chamber and for addition of material to be melted through a funnel 59.

The reduction in recovery time being provided by the ability to melt material faster and bring it up to temperature faster for application to roadway or runway surfaces is greatly desired. While illustrated as a single kettle, multiple kettles can be employed. For instance, white and yellow plastic melting kettles could be used to delineate traffic patterns. As previously stated, glass beads are sprinkled into the mol ten thermoplastic in order to provide for nighttime reflectivity. Since the speed of melting plastic is directly proportional to the square footage of heated surface area in contact with the volume of plastic, increasing the amount of heated surface in contact with the plastic results in more quickly melting the plastic, which is desired in the industry. By way of example, a kettle has a diameter of about 45 inches with an interior area of about 60 ft2. Referring to FIG. 6, illustrated is a pictorial of a kettle 130 about 45 inches in diameter and 60 inches in height. In this configuration, a vertically corrugated surface 132 provides an interior surface area of about 90 ft2. The increase in the interior surface using a corrugated surface 132 can nearly double the amount of interior surface area, thereby exposing more of the thermoplastic material and allowing an increase in heat transfer from the corrugated surface 132 to the thermoplastic material. An outer surface of the corrugated surface includes an oil jacket 133 for heating material as previously explained. Similarly, as illustrated in FIG. 7, a kettle 140 may have a horizontal corrugated surface 142 providing the same type of interior wall surface exposure to increase the amount of heat transfer, and an oil jacket 141 positioned along an exterior surface.

Figure 2:
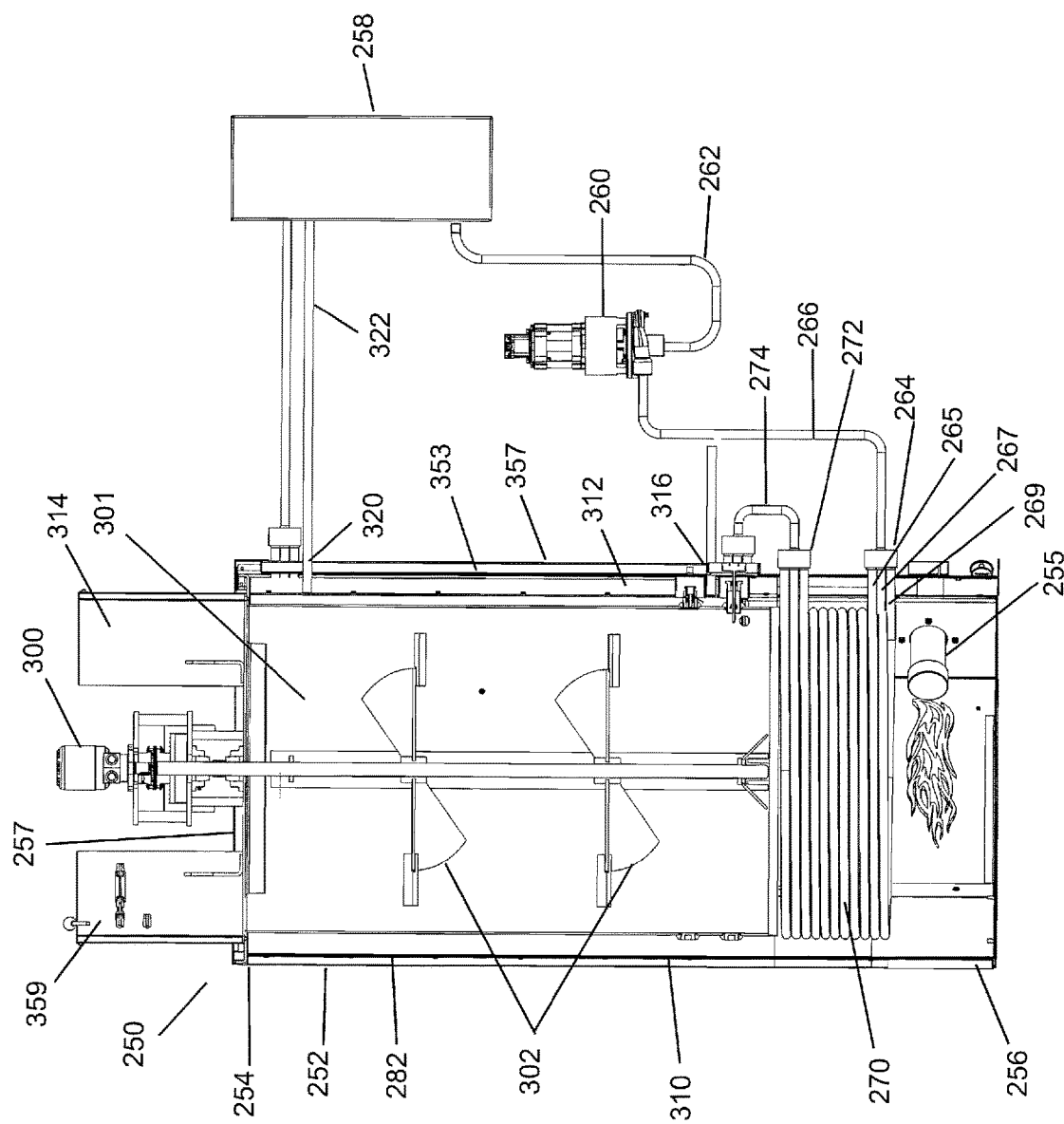
FIG. 2 is a cross sectional view of an embodiment illustrating an oil jacketed kettle employing an internal burner.

Referring to FIG. 2, in this embodiment a melter kettle 250 is adopted for use without an upper coil, which is preferable for use with materials such as bitumen due to the thicker viscosity. In this embodiment, a cylindrical side wall 252 defines a top section 254 and a bottom section 256. In the bottom section 256 is a burner 255 used to heat oil recirculated from an oil tank 258 by oil pump 260 through a transfer line 262. The oil pump 260 directs oil from the oil tank 258 into a first lower manifold 264 by feed line 266. The lower manifold inlet 264 splits the feed line 266 into three tubes 265, 267 and 269, forming a coil 270, which has been demonstrated to be most efficient by allowing additional tubing wall to be exposed to oil for heat transfer through convection and maintains the flow through the tubes in a laminar flow rate. The use of two tubes or more is considered within the scope of this invention, with three tubes being the preferred embodiment.

Oil is passed through the lower coil 270, wherein the flame from the burner 255 heats the oil which is collected by a lower manifold outlet 272 and delivered through a transfer line 274 to an oil jacket 310 placed around the cylindrical sidewall 282 wherein the hot oil transfer heat to the material within the kettle chamber 301. Oil is also delivered to the oil jacket 310 from the oil pump 260 through an oil jacket inlet 316 and oil is collected from the oil jacket 310 at an outlet 320 for return to the oil tank 258 through return line 322. The oil jacket 310 includes a series of baffles within a space between the kettle's cylindrical sidewall 252 and an oil jacket sidewall 353. Surrounding a majority of the oil jacket sidewall 353 is an insulated wall 357 providing a chimney space 312 for passing of waste heat and unburnt fuel for exhausting through a chimney stack 314. A mixer motor 300 is used for driving paddles 302 to mix the liquefied material throughout the chamber 301.

The oil jacket 310 is surrounded by a chimney 312 to permit collection of heat from the burner 255 exhaust before expulsion from a stack aperture 314. Oil is delivered to the oil jacket 310 from the oil pump 260 through an oil jacket inlet 316 with oil collected from an oil jacket outlet 320 and returned to the oil tank 258 through return line 322. The melting kettle 250 employs a mixer 300 for driving paddles 302 for mixing of the material to be applied. For instance, when bitumen is in use as the material, a smaller paddle 302 may be employed due to the thickness of the material. The use of an upper coil 80, as illustrated in FIG. 1, is recommended for application of thermoplastics. The cover 257 may be opened for inspection of the mixer 300 operation and for addition of material to the chamber 301.

Figure 3:
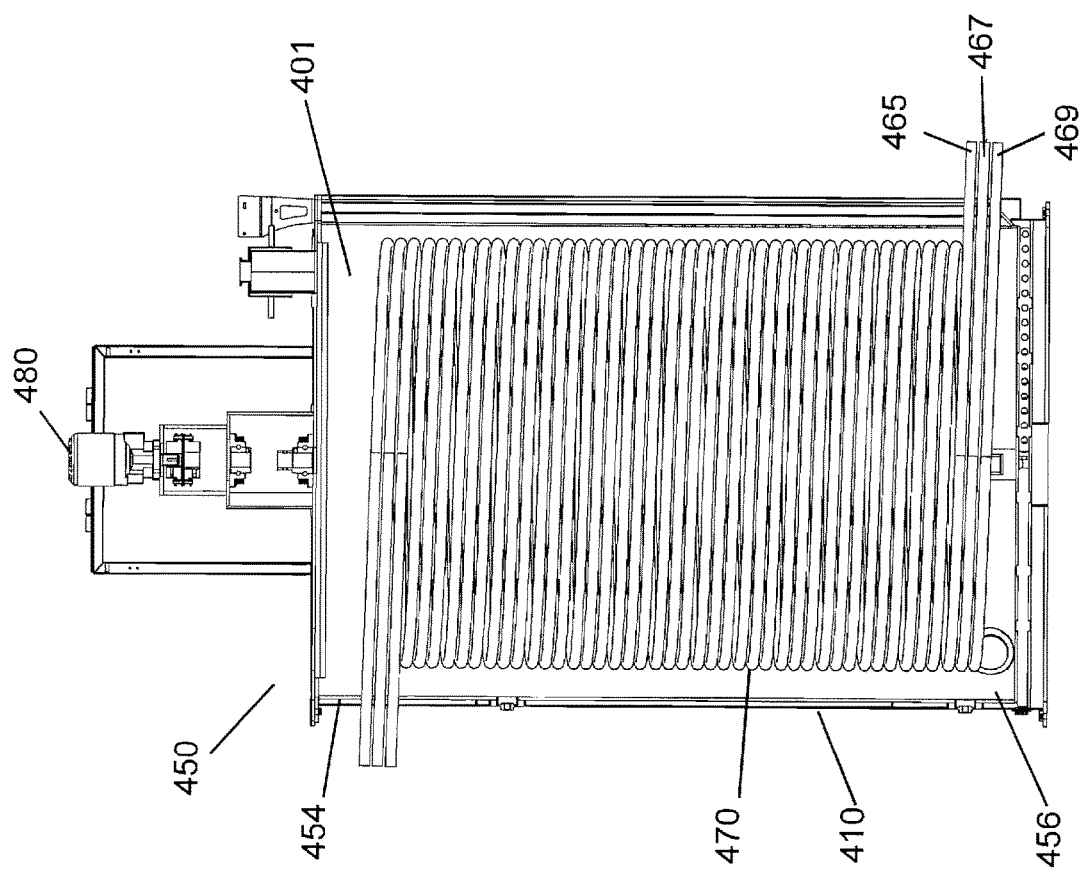
FIG. 3 is a cross sectional view of an embodiment illustrating a kettle with manifold coils.

Referring to FIG. 3, illustrated is an embodiment depicting a kettle 450 illustrating a coil 470 formed from three tubes 465, 467, and 469. This embodiment emphasizes the advantage of the coil 470 configuration wherein the adjacent tubes 465, 467, and 469 each carry oil of the same temperature, providing greater surface area for heating of material placed with the chamber 401. For instance, if a single tube extended from the bottom 456 to the top 454 of the kettle 450, heated oil in the middle of the tube does not effectuate heat transfer to the material within the kettle 450. The use of three tubes 465, 467, and 469 in place of a single tube allows heat transfer along the circumference of each tube to optimize the heat transfer. Use of three or more tubes has been demonstrated to be most efficient by allowing additional tubing wall to expose oil for heat transfer through convection and maintain a flow rate through the tubes at a laminar flow rate. As previously mentioned, the use of two, three, four, or more tubes to form a coil is considered within the scope of this invention. In this embodiment, the material placed within the chamber 401 will be heated by the coil 470 as well as an oil jacket 410 as explained in the previous embodiments. Similar to the previous embodiment, the kettle 450 may include a mixer 480 for rotation of paddles, not shown, to cause the material to pass along the coil 470 and the oil jacket 410 for proper heating of the material.

Figure 4:
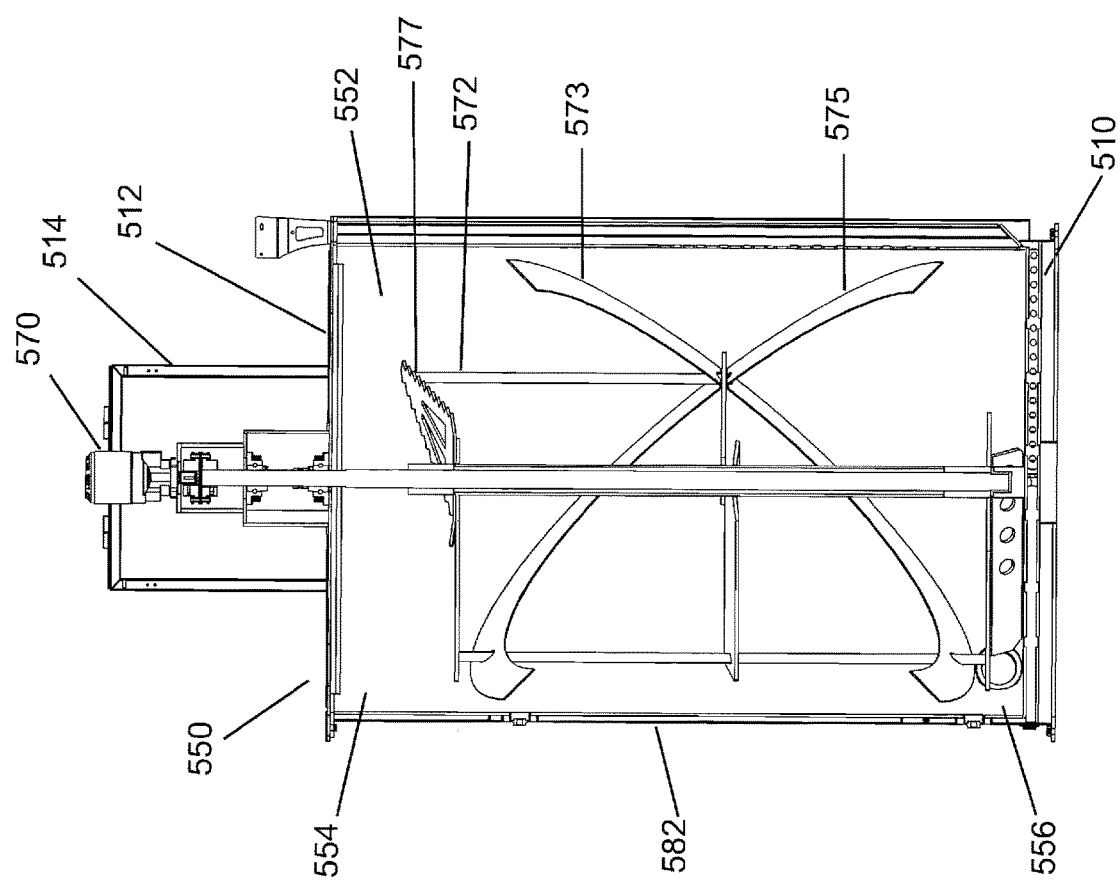
FIG. 4 is a cross sectional view of an embodiment illustrating an oil jacketed kettle.
Figure 5:
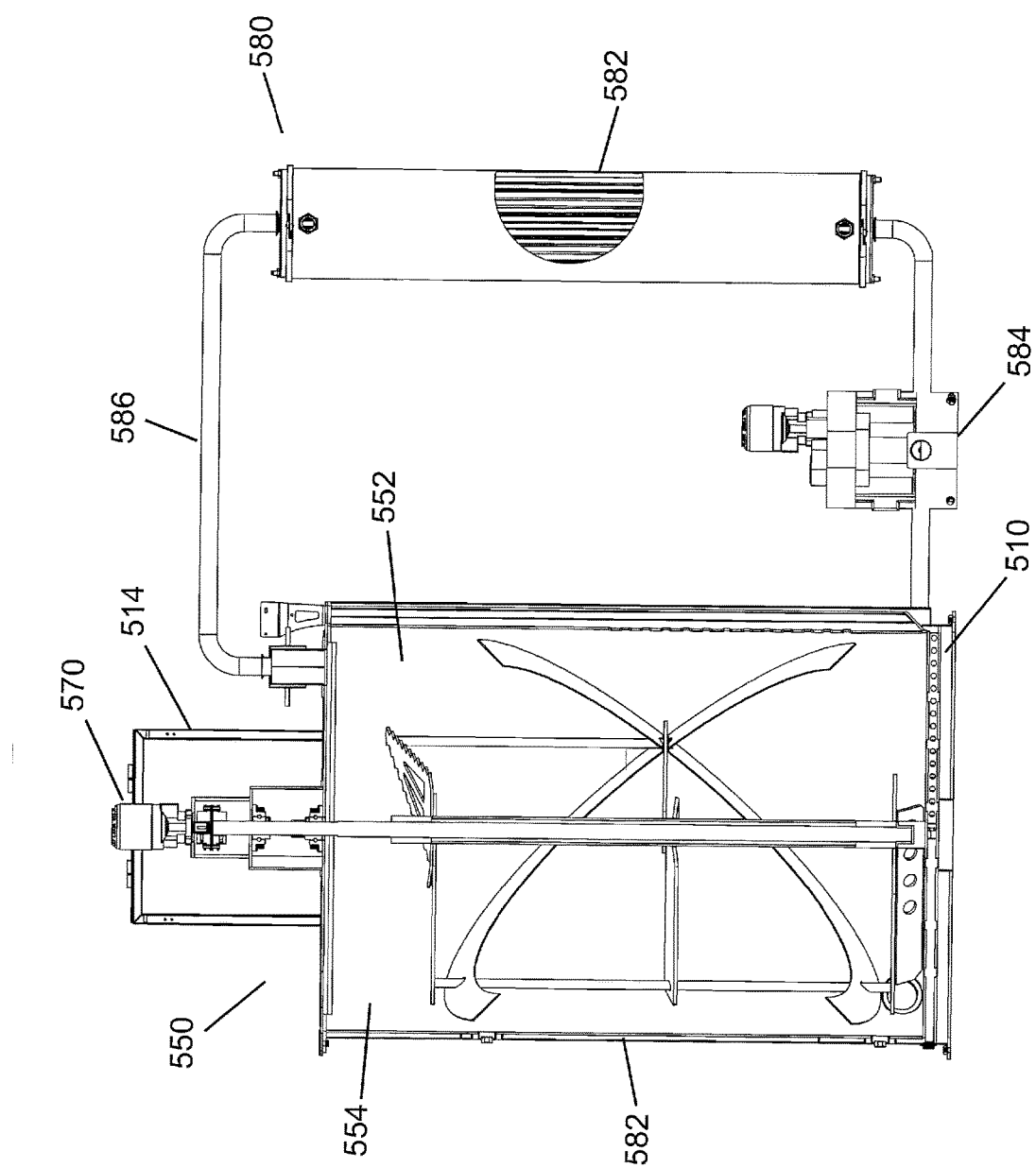
FIG. 5 is a cross sectional view of an embodiment illustrating an oil jacketed kettle with a heat exchanger.

Referring to FIG. 4, illustrated is an embodiment depicting a kettle 550 having a bottom 556, a top 554, and a continuous sidewall 582. The embodiment includes an oil jacket 510 for receipt of heated oil from a burner, not shown; the oil jacket 510 extending along the sidewall 582 having an entrance at the bottom 556 and an outlet 512 at the top 554 as described in the previous embodiment. A mixer motor 570 rotates a recirculating paddle 572 for mixing of material placed within the chamber 552; the recirculating paddle 572 having a propeller shape with two blades 573, 575 to cause movement of material to assure exposure to the heat from the oil jacket 510. A cutting blade 577 is used to release material from its storage bag and direct the power to accelerate the recovery time. The cover 512 has a funnel 514 for adding of material. Referring to FIG. 5, illustrated is the kettle 550 illustrated in FIG. 4 with the inclusion of a heat exchanger 580 to enhance the heating of the oil for faster melting of material. In this embodiment, a heat exchanger 580 having tubes 582 heated by hot oil in combination with a burner, not shown, uses a hot oil pump 584 for introduction of heated oil into the oil jacket 510. It is noted that the oil jacket may also receive heated oil directly from a burner, not shown. In this configuration, the burner may be used to heat oil for distribution in various extremities, such as the application gun, wherein the heat exchanger 580 is exclusive to the kettle 550, allowing a faster recovery time upon the addition of unmelted material. The oil is recirculated from the oil jacket 510 to the heat exchanger 580 by a return line 586. Essentially, the heat exchanger 580 boosts the hot oil recovery time for fast melting of material.

Figure 10:
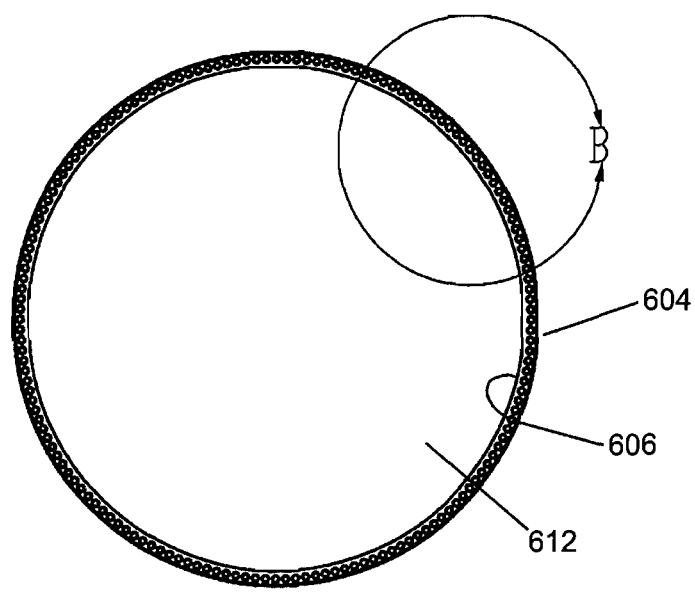
FIG. 10 is a top view of FIG. 8.
Figure 8:
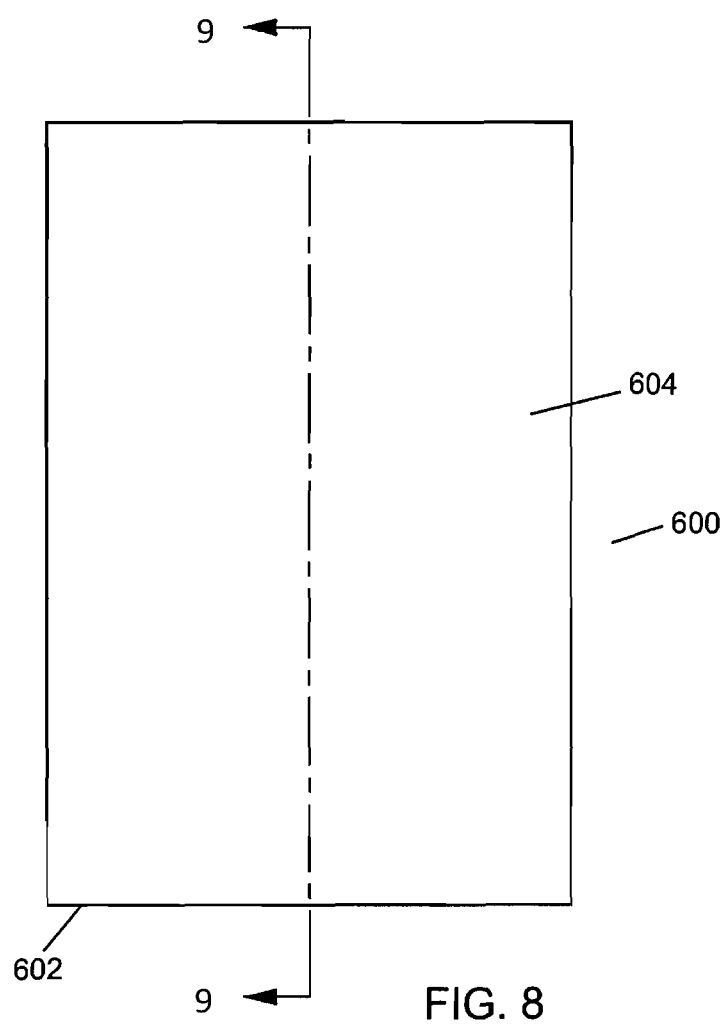
FIG. 8 is a side view of a kettle having an oil and thermoplastic jacketed wall.
Figure 11:
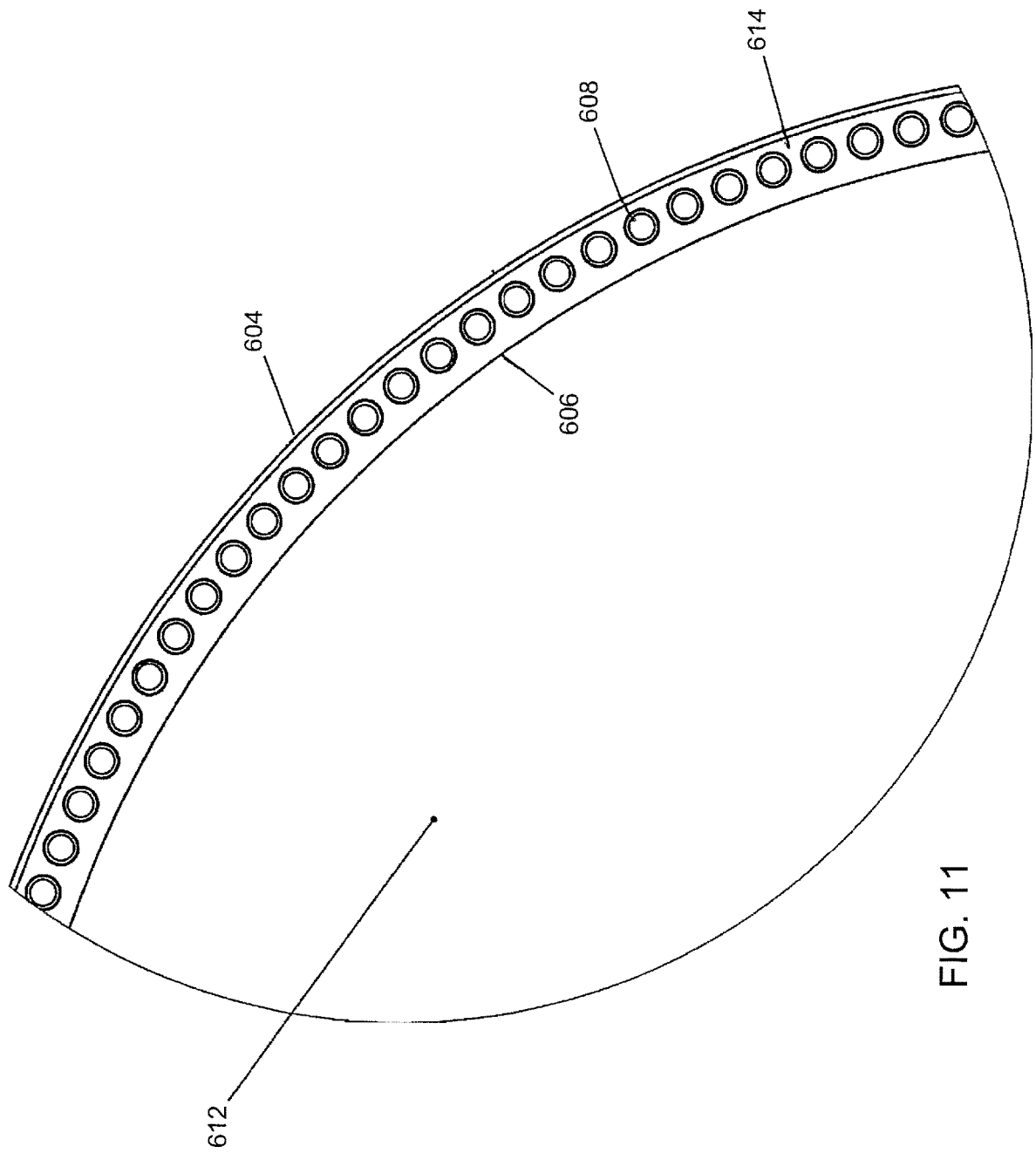
FIG. 11 is an enlarged sectional view of FIG. 8 taken along line B.

Referring to FIGS. 8-10 disclosed is another embodiment having a kettle 600 defined by a bottom wall 602 and a continuous outer sidewall 604. In this embodiment the outer sidewall 604 is spaced apart from an inner side wall 606 forming a jacket area with a plurality of tube 608 for transfer of liquid thermoplastic from an inlet 610 with the thermoplastic having an exit point 610 for deposit into the receptacle 612 forming the interior 612. An oil jacket 614 is formed around the tubes 608 and along a bottom section 616 of the kettle 600. The oil jacket operates in the same manner as previously described. Thermoplastic flowing through the tube 608 transmit heat from the oil flowing in the oil jacket 614.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way but may also be configured in ways that are not listed.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures, and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A melter kettle comprising:
   a kettle defined by a side wall having a top section separated from a bottom section by a burner wall, said top section including a cover for accessing a chamber formed in said top section;
   a burner positioned within said bottom section, said burner substantially enclosed by a lower coil;
   an oil pump recirculating oil from a hot oil tank through said lower coil;
   an oil jacket located adjacent said side wall and fluidly coupled to said oil pump, wherein hot oil from said oil tank is passed through said lower coil and said oil jacket for heating said kettle; and
   a mixer rotating paddles within said chamber;
   whereby material in said chamber is heated to a predetermined temperature by heating oil in said lower coil and recirculating the heated oil through said oil jacket.

2. The melter kettle according to claim 1 wherein said lower coil is further defined as multiple tubes having a common inlet placed adjacent to each other with a common outlet.

3. The melter kettle according to claim 2 wherein said multiple tubes for said lower coil consist of three tubes coiled together, said tubes constructed and arranged to increase heat transfer by increasing of surface area available for a predetermined flow of oil.

4. The melter kettle according to claim 1 wherein said side wall is corrugated to increase kettle wall surface area.

5. The melter kettle according to claim 1 including a chimney encompassing said oil jacket, said chimney channeling waste heat from said burner past said oil jacket.

6. The melter kettle according to claim 1 including an upper coil spaced apart from said inner surface of said chamber by a predetermined distance and fluidly coupled to said lower coil.

* * * * *